United States Patent
Schmitt

[15] 3,693,036
[45] Sept. 19, 1972

[54] LIQUID COOLED SERIES LOOP CONNECTOR

[72] Inventor: Nikolas Schmitt, Scotia, N.Y.
[73] Assignee: General Electric Company
[22] Filed: June 14, 1971
[21] Appl. No.: 152,680

[52] U.S. Cl. .................................................310/52
[51] Int. Cl. .......................................H02k 9/00
[58] Field of Search...........310/52, 54, 64, 65, 59, 58, 310/71, 260, 270; 285/235, 169, 150, 132

[56] References Cited

UNITED STATES PATENTS

| | | | |
|---|---|---|---|
| 3,112,415 | 11/1963 | Bahn | 310/54 |
| 3,614,493 | 10/1971 | Collings | 310/64 |
| 3,459,973 | 8/1969 | Dickinson | 310/54 |
| 2,640,726 | 6/1953 | Prescott | 285/169 |

FOREIGN PATENTS OR APPLICATIONS

| | | | |
|---|---|---|---|
| 24,561 | 10/1910 | Great Britain | 285/169 |
| 1,347,614 | 11/1963 | France | 285/235 |
| 810,904 | 6/1951 | Germany | 285/235 |

*Primary Examiner*—J. D. Miller
*Assistant Examiner*—R. Skudy
*Attorney*—William C. Crutcher et al.

[57] ABSTRACT

A connector for forming a fluid tight, electrically conductive joint between two juxtaposed, fluid-colled stator bar ends or between a bar end and a connection ring of a dynamoelectric machine which may be misaligned during stator assembly. The connector is comprised of two movable and rotatable fittings with a sleeve member therebetween which are so formed as to correct slight bar or connection ring misalignment. The sleeve member has an interior brazing surface at each end defined by a counterbored hole. In one embodiment, the sleeve is bent so that the centerlines of the counterbored holes are noncoincident. In other embodiments, the sleeve is straight but the counterbored holes are formed so that the centerlines of one or both counterbored holes do not coincide with the centerline of the sleeve.

8 Claims, 5 Drawing Figures

PATENTED SEP 19 1972

3,693,036

INVENTOR:
NICKOLAS SCHMITT,

BY James W. Mitchell
HIS ATTORNEY.

LIQUID COOLED SERIES LOOP CONNECTOR

BACKGROUND OF THE INVENTION

In general, this invention relates to liquid cooled dynamoelectric machines and in particular this invention applies to fluid and electrical connections between stator bars or stator bars and connection rings in the end turn region of a dynamoelectric machine stator.

In modern dynamoelectric machines, cooling systems are applied to the stator winding to remove heat generated by the electrical current flowing through the stator bars. One method of cooling the stator winding, provides cooling passages through the electrically conductive stator bars thereby furnishing a conduit for the flow of fluid coolant. This cooling method permits an increase in dynamoelectric machine ratings with a minimum increase in dynamoelectric machine size. Also, this system obviates the need for plumbing to transport fluid coolant around the stator winding.

The aforesaid cooling system is usually applied to the dynamoelectric machine in the following manner. Long, insulated stator bars with cooling passages therethrough are laid lengthwise into circumferentially spaced slots extending axially through the stator core. At each end of the stator core, the bar ends extend outwardly from the stator core in a generally axial direction. These bar ends must be connected in pairs, so that one bar end may be connected to another bar end which often is located from 30 to 180 circumferential degrees distance away. These bar ends must be connected both electrically and fluidly in what is generally referred to as the "end turn region." Additionally, at the ends of the dynamoelectric machine, inlet and outlet connections are furnished for supplying and retrieving fluid coolant in the dynamoelectric machine through the stator bars. For a more detailed description of a liquid-cooled generator, see U.S. Pat. No. 2,695,368 to Kilbourne issued Nov. 23, 1954 and assigned to the assignee of the present invention.

One problem, which may occur during the formation of end turn connections is misalignment of the stator bar ends or connection rings. Misalignment may be a matter of inches or fractions thereof but even such a small diversion may prevent the formation of a tight connection between these electrical members. One solution, to this problem, which has been proposed, is found in U.S. Patent Application Ser. No. 6902 filed Jan. 29, 1970 by Collings and Darby, now U.S. Pat. No. 3,614,493 assigned to the assignee of the present invention. In that application, first and second headers are attached to the juxtapositioned ends of a pair of stator bars and are joined by means of rotatable, telescoping joints to fittings having mating cylindrical surfaces. These fittings are aligned by sliding the cylindrical surfaces upon one another, and then are brazed together. However, the above mentioned special fittings are complicated and relatively expensive to fabricate.

OBJECTS OF THE INVENTION

It is an object of this invention to provide an improved connector between two stator bars or a stator bar and connection ring which is both electrically conductive and fluid conducting.

It is another object of this invention to provide an improved connector between two stator bars or a stator bar and connection ring which will accommodate bar misalignment in the end turn region of the stator core.

Other objects, advantages and features of the present invention will become apparent from the following detailed description when taken in connection with the following drawings.

SUMMARY OF THE INVENTION

Bar end misalignment in the end turn region of the stator is accommodated by a sleeve having end bores which have non-coincident centerlines. The sleeve is positioned between two pipe sections which are each slidably and rotatably mounted into a header fixed on the end of each stator bar. The sleeve may be formed with a bend which causes the end bores to have centerlines which are non-coincident. In alternate embodiments, the sleeve is straight, but the counterbore hole centerlines of one or both end bores are non-coincident with the centerline of the sleeve. The sleeve will accommodate anticipated convergence and divergence or skewing of the axial centerlines of the pipe sections mounted into the headers on the stator bars. The pipe sections are slidable and rotatable within the headers adding flexibility for adjustments. After the desired connection alignment is achieved, the connection joints are brazed and the entire assembly is insulated.

DETAILED DESCRIPTION OF THE INVENTION

Figure 1:
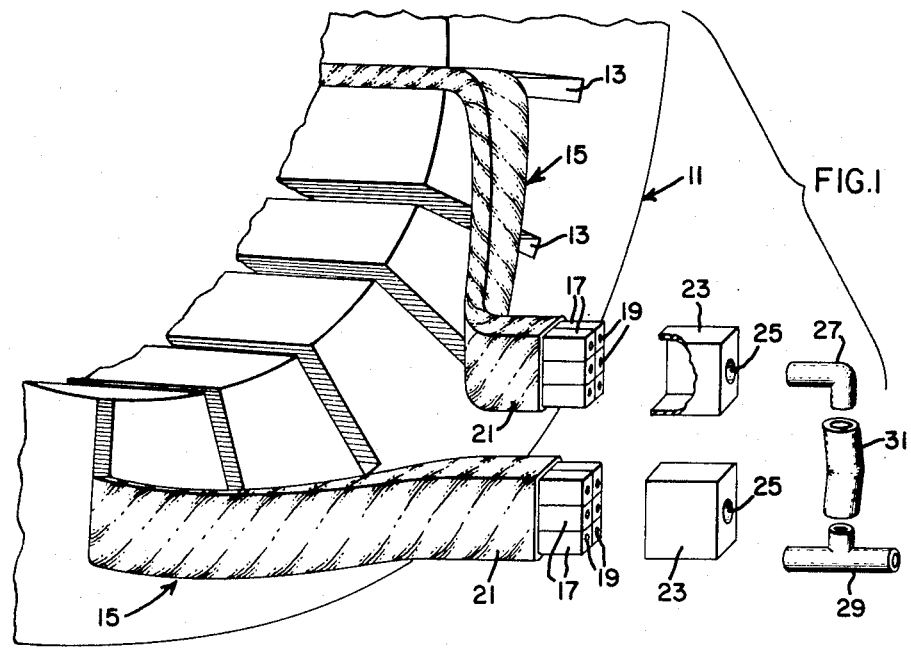
FIG. 1 is a perspective exploded view of the present invention applied in the end turn region of a stator core.
Figure 2:
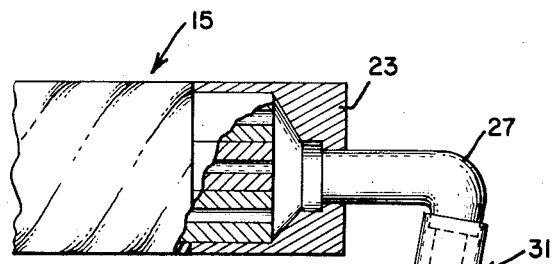
FIG. 2 is an elevation view of one embodiment of the present invention applied to two stator bar ends.

As shown in FIGS. 1 and 2, the stator core 11 is formed with a plurality of circumferentially spaced slots 13 into which a plurality of stator bars 15 are laid lengthwise. FIG. 1 shows two typical stator bars only, and it should be realized that in actual practice stator bars may occur two to a slot, one laying radially adjacent another resulting in a rather complicated end turn configuration. In FIG. 1 the stator bars are shown as including several conductive elements or strands 17 each having an internal passageway 19 therethrough for distributing fluid coolant. The several strands are then wrapped in high-voltage ground insulation 21.

A header 23 is affixed to each bar end; the header being an electrically conductive hollow box-like element. Slidably inserted into an opening 25 is an electrically conductive pipe section in the form of an elbow 27 or a T 29. The tee may be used where necessary for conducting fluid coolant into and out of the hollow headers and strand passages. These pipe sections are slidably inserted into the headers so that adjustments may be made in aligning the centerlines of the two pipes. Also the pipes are rotatable with respect to the header for additional alignment flexibility.

Figure 3:
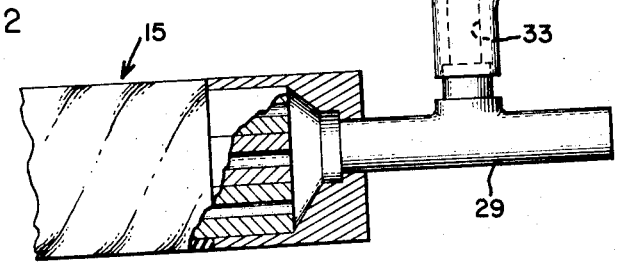
FIGS. 3, 4 and 5 are all elevation views of the sleeve portion of present invention and alternate embodiments thereof.

FIGS. 1, 2 and 3 show one embodiment of the applicant's invention in the form of a bent sleeve 31 having an interior bore 33. At each end of the sleeve there is an enlarged counterbore 35 the interior of which normally provides a brazing surface when a pipe section is fitted therein. It should be appreciated that in this particular embodiment of the applicant's invention, the exterior surface of the sleeve could alternatively become one brazing surface while the interior of the pipe section could be the other brazing surface. Since the sleeve has a bend therein, the centerlines of the counterbored holes at each end of the sleeve do not coincide with one another but form an angle γ as shown relative to one another. This angle may usually be in the order of 10° although other angles are possible and the drawings have been somewhat exaggerated for clarity and illustration. This bend in the sleeve allows the sleeve to form a tight connection because it accommodates divergence or convergence or skewing of the centerlines of the pipe sections to which it is connected. Once the proper connection alignment is achieved, the headers, the pipe sections, and the sleeve are brazed and insulated.

Figure 4:
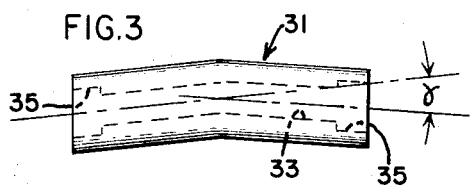
Figure 5:
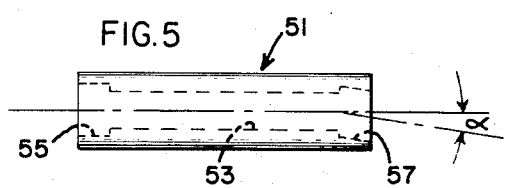

FIGS. 4 and 5 show alternate embodiments of the applicant's invention. FIG. 4 discloses a straight sleeve 41 having an interior bore 43 and a pair of enlarged counterbore holes 45 at each end of the sleeve. The counterbored holes have centerlines which are non-coincident with the centerline of the sleeve and also these counterbored holes have centerlines which are non-coincident with each other. Similar to the bent sleeve embodiment shown in FIG. 3, the sleeve as shown in FIG. 4 permits proper alignment of the sleeve between divergent or convergent or skewed centerlines of the pipe sections.

FIG. 5 discloses another embodiment of this invention, wherein a sleeve 51 has an inner bore 53 and a pair of enlarged counterbored holes 55 and 57 respectively at each end of the sleeve. As is apparent from the drawing, the counterbore hole 55 has a centerline which is coincident with the centerline of the sleeve while counterbore hole 57 has a centerline which is non-coincident with the centerline of the sleeve. Again this permits easy alignment between the sleeve and the centerlines of both pipe sections.

In both embodiments shown in FIGS. 4 and 5 the angle α which the centerlines of the enlarged counterbore holes makes with the centerline of the sleeve is usually in the order of 5° or 10° respectively although other angles are possible.

OPERATION OF THE INVENTION

After the stator bars are positioned within the stator core slots, the hollow box-like headers having been prebrazed to the stator bar ends, the pipe sections are fitted into the openings provided in the headers so that pipe sections may move back and forth axially and also rotate about their own axes. This is to provide flexibility in aligning the centerlines of the two pipe sections. The pipe sections are usually elbows, but, at points where fluid is to be fed into and taken out of the cooling system T-joints may be provided. Once the pipe section centerlines are closely aligned, the sleeve is inserted therebetween so as to utilize the misalignment correction feature of the sleeve to best advantage. When all pieces provide a fluid-tight fit, the connection is then brazed and insulated.

While various modifications have been illustrated with respect to the invention herein disclosed, it will be obvious to those skilled in the art that still other modifications are feasible; and it is desired to include by the appended claims all such modifications as fall within the true spirit and scope of the invention.

What is claimed:

1. In a fluid cooled dynamoelectric machine including, a stator core with a plurality of electrically conductive members disposed therein, said electrically conductive members having passages therein for transporting fluid coolant through the electrically conductive members; a connector for electrically and fluidly coupling first and second electrically conductive members, including:

electrically and fluidly conductive headers attached to the ends of said first and second members;
   a first electrically conductive fitting rotatably and slidably mounted into said header on said first member;
   a second electrically conductive fitting rotatably and slidably mounted into said header on said second member; and,
   a substantially straight, rigid electrically conductive sleeve interconnected between said first and second fittings providing the sole electrical and fluidic connection, said sleeve having end bores, the centerlines of which are non-coincident with respect to one another, whereby misalignment between the first and second electrically conductive members is accommodated.

2. The connector as recited in claim 1 wherein said first and second electrically conductive members are stator bars.

3. The connector as recited in claim 1 wherein at least one of said first and second electrically conductive members is a stator bar.

4. The connector as recited in claim 1 wherein said first and second fittings are elbow joints.

5. The connector as recited in claim 1 wherein said first fitting is an elbow joint and said second fitting is a T-joint, the latter providing inlet and outlet fluid passages.

6. The connector as recited in claim 1 wherein the sleeve is formed with a bend so that the centerlines of the end bores intersect at an angle in the order of 10°.

7. In a fluid cooled dynamoelectric machine including, a stator core with a plurality of electrically conductive members disposed therein, said electrically conductive members having passages therein for transporting fluid coolant through the electrically conductive members; a connector for electrically and fluidly coupling first and second electrically conductive members, including:

electrically and fluidly conductive headers attached to the ends of said first and second members;
   a first electrically conductive fitting rotatably and slidably mounted into said header on said first member;
   a second electrically conductive fitting rotatably and slidably mounted into said header on said second member; and,
   an electrically conductive sleeve interconnected between said first and second fittings, said sleeve having end bores, the centerlines of which are non-coincident with respect to one another and non-coincident with the centerline of the sleeve whereby misalignment between the first and second electrically conductive members is accommodated.

8. In a fluid cooled dynamoelectric machine including, a stator core with a plurality of electrically conductive members disposed therein, said electrically conductive members having passages therein for transporting fluid coolant through the electrically conductive members; a connector for electrically and fluidly coupling first and second electrically conductive members, including:

electrically and fluidly conductive headers attached to the ends of said first and second members;

a first electrically conductive fitting rotatably and slidably mounted into said header on said first member;

a second electrically conductive fitting rotatably and slidably mounted into said header on said second member; and, an electrically conductive sleeve interconnected between said first and second fittings, said sleeve having end bores, the centerlines of which are non-coincident with respect to one another and wherein one end bore has a centerline coincident with the centerline of the sleeve while the other end bore has a centerline which is non-coincident with the centerline of the sleeve and said one end bore, whereby misalignment between the first and second electrically conductive members is accommodated.

* * * * *